(12) United States Patent
Lainema et al.

(10) Patent No.: US 12,368,890 B2
(45) Date of Patent: Jul. 22, 2025

(54) METHOD, AN APPARATUS AND A COMPUTER PROGRAM PRODUCT FOR VIDEO ENCODING AND VIDEO DECODING

(71) Applicant: Nokia Technologies Oy, Espoo (FI)

(72) Inventors: Jani Lainema, Tampere (FI); Alireza Aminlou, Tampere (FI)

(73) Assignee: Nokia Technologies Oy, Espoo (FI)

( * ) Notice: Subject to any disclaimer, the term of this patent is extended or adjusted under 35 U.S.C. 154(b) by 52 days.

(21) Appl. No.: 18/560,420

(22) PCT Filed: May 5, 2022

(86) PCT No.: PCT/FI2022/050298
§ 371 (c)(1),
(2) Date: Nov. 13, 2023

(87) PCT Pub. No.: WO2022/238616
PCT Pub. Date: Nov. 17, 2022

(65) Prior Publication Data
US 2024/0259597 A1    Aug. 1, 2024

(30) Foreign Application Priority Data
May 12, 2021 (FI) .................................... 20215563

(51) Int. Cl.
*H04N 19/60* (2014.01)
*H04N 19/176* (2014.01)

(52) U.S. Cl.
CPC ........... *H04N 19/60* (2014.11); *H04N 19/176* (2014.11)

(58) Field of Classification Search
CPC .... H04N 19/60; H04N 19/176; H04N 19/136; H04N 19/61; H04N 19/12
See application file for complete search history.

(56) References Cited

U.S. PATENT DOCUMENTS

2012/0128065 A1* 5/2012 Shibahara .............. H04N 19/42
                                                            375/240.03
2013/0177077 A1    7/2013 Yeo et al.
(Continued)

FOREIGN PATENT DOCUMENTS

EP    2464013 A1    6/2012
EP    3637767 A1    4/2020

OTHER PUBLICATIONS

"Video Coding For Low Bit Rate Communication", Series H: Audiovisual And Multimedia Systems, Infrastructure of audiovisual services—Coding of moving Video, Recommendation ITU-T H.263, Jan. 2005, 226 pages.
(Continued)

*Primary Examiner* — Nam D Pham
(74) *Attorney, Agent, or Firm* — Nokia Technologies Oy

(57) ABSTRACT

The embodiments relate to a method and technical equipment for implementing the method. The method comprises receiving a block of input samples; performing at least a first inverse transform on a first set of input samples, resulting in a first set of inverse transformed samples; performing at least a second inverse transform on a second set of input samples, resulting in a second set of inverse transformed samples; determining statistical information related to the first set of inverse transformed samples and for determining statistical information related to the second set of inverse transformed samples; updating the first inverse transform based on the determined statistical information related to the first set of inverse transformed samples; and updating the second inverse transform based on the determined statistical information related to the second set of inverse transformed samples.

14 Claims, 10 Drawing Sheets

(56) References Cited

U.S. PATENT DOCUMENTS

| | | |
|---|---|---|
| 2017/0094313 A1 | 3/2017 | Zhao et al. |
| 2019/0158878 A1 | 5/2019 | Philippe et al. |
| 2019/0253735 A1 | 8/2019 | Lasserre et al. |
| 2020/0137388 A1 | 4/2020 | Kanoh et al. |

OTHER PUBLICATIONS

"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.

"High Efficiency Video Coding", Series H: Audiovisual And Multimedia Systems, Infrastructure of audiovisual services—Coding of moving video, Recommendation ITU-T H.265, Feb. 2018, 692 pages.

Lan et al., "Exploiting Non-Local Correlation via Signal-Dependent Transform (SDT)", IEEE Journal of Selected Topics in Signal Processing, vol. 5, No. 7, Nov. 2011, pp. 1298-1308.

Lan et al., "Enhancement of HEVC using Signal Dependent Transform (SDT)", ITU—Telecommunications Standardization Sector, VCEG-AZ08, Microsoft Research, Jun. 19-26, 2015, 7 pages.

Office Action received for corresponding Finnish Patent Application No. 20215563, dated Nov. 30, 2021, 10 pages.

International Search Report and Written Opinion received for corresponding Patent Cooperation Treaty Application No. PCT/FI2022/050298, dated Nov. 30, 2022, 17 pages.

Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, N17055, JVET, Jul. 13-21, 2017, 48 pages.

Extended European Search Report received for corresponding European Patent Application No. 22806899.5, dated Feb. 26, 2025, 9 pages.

* cited by examiner

METHOD, AN APPARATUS AND A COMPUTER PROGRAM PRODUCT FOR VIDEO ENCODING AND VIDEO DECODING

RELATED APPLICATION

This application was originally filed as PCT Application No. PCT/FI2022/050298, filed on May 5, 2022, which claims priority from FI application No. 20215563, filed on May 12, 2021, each of which is incorporated herein by reference in its entirety.

TECHNICAL FIELD

The present solution generally relates to coding and decoding of digital media content, such as video data.

BACKGROUND

This section is intended to provide a background or context to the invention that is recited in the claims. The description herein may include concepts that could be pursued but are not necessarily ones that have been previously conceived or pursued. Therefore, unless otherwise indicated herein, what is described in this section is not prior art to the description and claims in this application and is not admitted to be prior art by inclusion in this section.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

According to a first aspect, there is provided an apparatus comprising at least means for receiving a block of input samples; means for performing at least a first inverse transform on a first set of input samples from the block of input samples, resulting in a first set of inverse transformed samples; means for performing at least a second inverse transform on a second set of input from the block of input samples, resulting in a second set of inverse transformed samples; means for determining statistical information related to the first set of inverse transformed samples and for determining statistical information related to the second set of inverse transformed samples; means for updating the first inverse transform based on the determined statistical information related to the first set of inverse transformed samples; and updating the second inverse transform based on the determined statistical information related to the second set of inverse transformed samples.

According to a second aspect, there is provided an apparatus comprising at least one processor, memory including computer program code, the memory and the computer program code configured to, with the at least one processor, cause the apparatus to perform at least the following: receive a block of input samples; perform at least a first inverse transform on a first set of input samples from the block of input samples, resulting in a first set of inverse transformed samples; perform at least a second inverse transform on a second set of input samples from the block of input samples, resulting in a second set of inverse transformed samples; determine statistical information related to the first set of inverse transformed samples and for determining statistical information related to the second set of inverse transformed samples; update the first inverse transform based on the determined statistical information related to the first set of inverse transformed samples; and update the second inverse transform based on the determined statistical information related to the second set of inverse transformed samples.

According to a third aspect, there is provided a method comprising receiving a block of input samples; performing at least a first inverse transform on a first set of input samples from the block of input samples, resulting in a first set of inverse transformed samples; performing at least a second inverse transform on a second set of input samples from the block of input samples, resulting in a second set of inverse transformed samples; determining statistical information related to the first set of inverse transformed samples and for determining statistical information related to the second set of inverse transformed samples; updating the first inverse transform based on the determined statistical information related to the first set of inverse transformed samples; and updating the second inverse transform based on the determined statistical information related to the second set of inverse transformed samples.

According to a fourth aspect, there is provided a computer program product comprising computer program code configured to, when executed on at least one processor, cause an apparatus or a system to: receive a block of input samples; perform at least a first inverse transform on a first set of input samples from the block of input samples, resulting in a first set of inverse transformed samples; perform at least a second inverse transform on a second set of input samples from the block of input samples, resulting in a second set of inverse transformed samples; determine statistical information related to the first set of inverse transformed samples and for determining statistical information related to the second set of inverse transformed samples; update the first inverse transform based on the determined statistical information related to the first set of inverse transformed samples; and update the second inverse transform based on the determined statistical information related to the second set of inverse transformed samples.

According to an embodiment, at least a first and a second input sample are determined from the block of input samples, and the first inverse transform is performed on said first set of input samples comprising said at least first and second input samples.

According to an embodiment, at least a third and a fourth input sample are determined from the block of input samples, wherein said third and fourth input samples are different from the first and second input samples, and the second inverse transform is performed on said second set of input samples comprising said at least third and fourth input samples.

According to an embodiment, said second set of input samples comprises the first set of inverse transformed samples.

According to an embodiment, the statistical information comprises one or more of the following: covariance between at least two sample values; variance of one or more sample values; average value of one or more sample values.

According to an embodiment, a first or a second inverse transform is any of the following: transform based on a location of input samples; based on coding unit; prediction unit or transform unit parameters; transform based on prediction block characteristics.

According to an embodiment, a first or a second inverse transform is a horizontal transform or a vertical transform or a diagonal transform or a transform along other direction.

According to an embodiment, the computer program product is embodied on a non-transitory computer readable medium.

DESCRIPTION OF THE DRAWINGS

In the following, various embodiments will be described in more detail with reference to the appended drawings, in which.

DESCRIPTION OF EXAMPLE EMBODIMENTS

Figure 1:
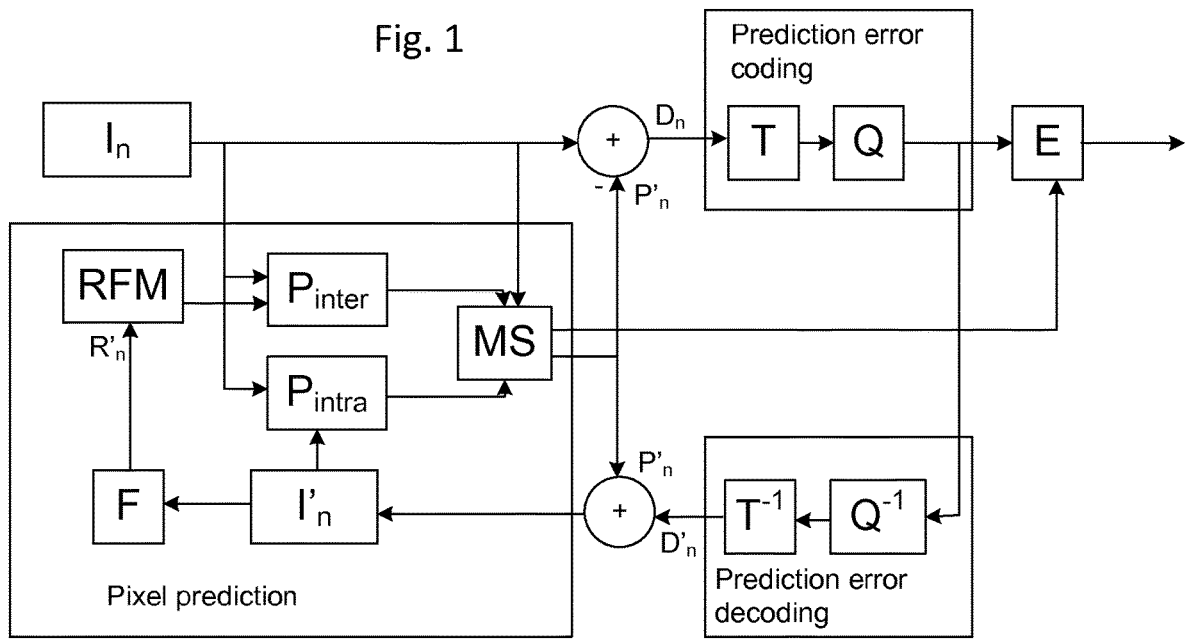
FIG. 1 shows an example of an encoding process.

The following description and drawings are illustrative and are not to be construed as unnecessarily limiting. The specific details are provided for a thorough understanding of the disclosure. However, in certain instances, well-known or conventional details are not described in order to avoid obscuring the description. References to one or an embodiment in the present disclosure can be, but not necessarily are, reference to the same embodiment and such references mean at least one of the embodiments.

Reference in this specification to "one embodiment" or "an embodiment" means that a particular feature, structure, or characteristic described in connection with the embodiment in included in at least one embodiment of the disclosure.

Video codec consists of an encoder and a decoder. The encoder is configured to transform input video into a compressed representation suitable for storage/transmission. The decoder is configured to uncompress the compressed video representation back into a viewable form. The encoder may discard some information in the original video sequence in order to represent the video in a more compact form (that is, at lower bitrate).

An elementary unit for the input to an encoder and the output of a decoder, respectively, in most cases is a picture. A picture given as an input to an encode may also be referred to as a source picture, and a picture decoded by a decoder may be referred to as a decoded picture or a reconstructed picture.

The source and decoded picture are each comprised of one or more sample arrays, such as one of the following sets of sample arrays:

Luma (Y) only (monochrome);
Luma and two chroma (YCbCr or YCgCo);
Green, Blue, and Red (GBR, also known as RGB);
Arrays representing other unspecified monochrome or tri-stimulus color samplings (for example, YZX, also known as XYZ).

A picture may be defined to be either a frame or a field. A frame comprises a matrix of luma samples and possibly the corresponding chroma samples. A field is a set of alternate sample rows of a frame, and may be used as encoder input, when the source signal is interlaced. Chroma sample arrays may be absent (and hence monochrome sampling may be in use) or chroma sample arrays may be subsampled when compared to luma sample arrays.

A bitstream may be defined as a sequence of bits, which may in some coding formats or standards be in the form of a network abstraction layer (NAL) unit stream or a byte stream, that forms the representation of coded pictures and associated data forming one or more coded video sequence. A first bitstream may be followed by a second bitstream in the same logical channel, such as in the same file or in the same connection of a communication protocol. An elementary stream (in the context of video coding) may be defined as a sequence of one or more bitstreams. In some coding formats or standards, the end of the first bitstream may be indicated by a specific NAL unit, which may be referred to as the end of the bitstream (EOB) NAL unit and which is the last NAL unit of the bitstream.

The phrase "along the bitstream" (e.g., indicating along the bitstream) or along a coded unit of a bitstream (e.g., indicating along a coded tile) may be used in claims and described embodiments to refer to transmission, signaling or storage in a manner that the "out-of-band" data is associated with but not included within the bitstream or the coded unit, respectively. The phrase decoding along the bitstream or along a coded unit of a bitstream or alike may refer to decoding the referred out-of-band data (which may be obtained from out-of-band transmission, signalling, or storage) that is associated with the bitstream or the coded unit, respectively. For example, the phrase along the bitstream may be used when the bitstream is contained in a container file, such as a file conforming to the ISO Base Media File Format, and certain file metadata is stored in the file in a manner that associates the metadata to the bitstream, such as boxes in the sample entry for a track containing the bitstream, a sample group for the track containing the bitstream, or a timed metadata track associated with the track containing the bitstream.

Hybrid video codecs, such as for example ITU-T H.263 and H.264, encode the video information in two phases. At first, pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). In the first phase, predictive coding can be applied, for example, as so-called sample prediction and/or so-called syntax prediction. In the sample prediction, pixel of sample values in a certain picture area or "block" are predicted. These pixel or sample values can be predicted, for example, using one or more of motion compensation or intra prediction mechanism. Secondly the prediction error, i.e., the difference between the predicted block of pixels and the original block of pixels, is coded. This may be done by transforming the difference in pixel values using a specified transform (e.g., Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

The example of the encoding process is illustrated in FIG. 1. FIG. 1 illustrates an image to be encoded ($I_n$); a predicted representation of an image block ($P'_n$); a prediction error signal ($D_n$); a reconstructed prediction error signal ($D'_n$); a preliminary reconstructed image ($I'_n$); a final reconstructed image ($R'_n$); a transform (T) and inverse transform ($T^{-1}$); a quantization (Q) and inverse quantization ($Q^{-1}$); entropy encoding (E); a reference frame memory (RFM); inter prediction ($P_{inter}$); intra prediction ($P_{intra}$); mode selection (MS) and filtering (F).

In some video codecs, such as H.265/HEVC, video pictures are divided into coding units (CU) covering the area of the picture. A CU consists of one or more prediction units (PU) defining the prediction process for the samples within the CU and one or more transform units (TU) defining the prediction error coding process for the samples in the said CU. A CU may consist of a square block of samples with a size selectable from a predefined set of possible CU sizes. A CU with the maximum allowed size may be called as LCU (largest coding unit) or CTU (coding tree unit) and the video picture is divided into non-overlapping CTUs. A CTU can be further split into a combination of smaller CUs, e.g., by recursively splitting the CTU and resultant CUs. Each resulting CU may have at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g., motion vector information for inter predicted PUs and intra prediction directionality information for intra predicted PUs). Similarly, each TU is associated with information describing the prediction error decoding process for the samples within the said TU (including e.g., DCT coefficient information). It may be signaled at CU level whether prediction error coding is applied or not for each CU. In the case there is no prediction error residual associated with the CU, it can be considered there are no TUs for the said CU. The division of the image into CUs, and division of CUs into PUs and TUs may be signaled in the bitstream allowing the decoder to reproduce the intended structure of these units.

Figure 2:
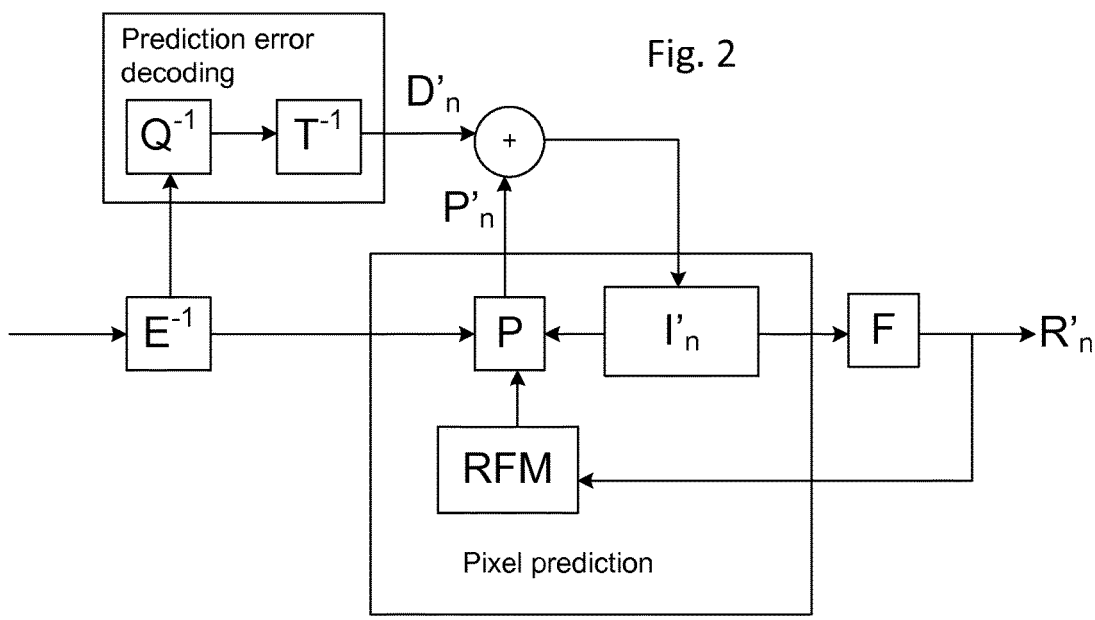
FIG. 2 shows an example of a decoding process.

The decoder may reconstruct the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence. An example of a decoding process is illustrated in FIG. 2. FIG. 2 illustrates a predicted representation of an image block ($P'_n$); a reconstructed prediction error signal ($D'_n$); a preliminary reconstructed image ($I'_n$); a final reconstructed image ($R'_n$); an inverse transform ($T^{-1}$); an inverse quantization ($Q^{-1}$); an entropy decoding ($E^{-1}$); a reference frame memory (RFM); a prediction (either inter or intra) (P); and filtering (F).

Instead, or in addition to approaches utilizing sample value prediction and transform coding for indicating the coded sample values, a color palette based coding can be used. Palette based coding refers to a family of approaches for which a palette, i.e., a set of colors and associated indexes, is defined and the value for each sample within a coding unit is expressed by indicating its index in the palette. Palette based coding can achieve good coding efficiency in coding units with a relatively small number of colors (such as image areas which are representing computer screen content, like text or simple graphics). In order to improve the coding efficiency of palette coding different kinds of palette index prediction approaches can be utilized, or the palette indexes can be run-length coded to be able to represent larger homogenous image areas efficiently. Also, in the case the CU contains sample values that are not recurring within the CU, escape coding can be utilized. Escape coded samples are transmitted without referring to any of the palette indexes. Instead, their values are indicated individually for each escape coded sample.

In video codecs the motion information may be indicated with motion vectors associated with each motion compensated image block. Each of these motion vectors represents the displacement of the image block in the picture to be coded (in the encoder side) or decoded (in the decoder side) and the prediction source block in one of the previously coded or decoded pictures. In order to represent motion vectors efficiently those may be coded differentially with respect to block specific predicted motion vectors. In video codecs the predicted motion vectors may be created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of previously coded/decoded picture can be predicted. The reference index may be predicted from adjacent blocks and/or or co-located blocks in temporal reference picture. Moreover, high efficiency video codecs may employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information may be carried out using the motion field information of adjacent blocks and/or co-located blocks in temporal reference pictures and the used motion field information is signaled among a list of motion field candidate list filled with motion field information of available adjacent/co-located blocks.

Video codecs may support motion compensated prediction from one source image (uni-prediction) and two sources (bi-prediction). In the case of uni-prediction a single motion vector is applied whereas in the case of bi-prediction two motion vectors are signaled and the motion compensated predictions from two sources are averaged to create the final sample prediction. In the case of weighted prediction, the relative weights of the two predictions can be adjusted, or a signaled offset can be added to the prediction signal.

In addition to applying motion compensation for inter picture prediction, similar approach can be applied to intra picture prediction. In this case the displacement vector indicates where from the same picture a block of samples can be copied to form a prediction of the block to be coded or decoded. This kind of intra block copying methods can improve the coding efficiency substantially in presence of repeating structures within the frame—such as text or other graphics.

In video codecs the prediction residual after motion compensation or intra prediction may be first transformed with a transform kernel (like DCT) and then coded. The reason for this is that often there still exists some correlation among the residual and transform can in many cases help reduce this correlation and provide more efficient coding.

Video encoders may utilize Lagrangian cost functions to find optimal coding modes, e.g., the desired Macroblock mode and associated motion vectors. This kind of cost function uses a weighting factor λ to tie together the (exact or estimated) image distortion due to lossy coding methods and the (exact or estimated) amount of information that is required to represent the pixel values in an image area:

$$C = D + \lambda R \quad \text{(Eq. 1)}$$

where C is the Lagrangian cost to be minimized, D is the image distortion (e.g., Mean Squared Error) with the mode and motion vectors considered, and R the number of bits needed to represent the required data to reconstruct the image block in the decoder (including the amount of data to represent the candidate motion vectors).

Scalable video coding refers to coding structure where one bitstream can contain multiple representations of the content at different bitrates, resolutions, or frame rates. In these cases, the receiver can extract the desired representation depending on its characteristics (e.g., resolution that matches best the display device). Alternatively, a server or a network element can extract the portions of the bitstream to be transmitted to the receiver depending on e.g., the network characteristics or processing capabilities of the receiver. A scalable bitstream may consist of a "base layer" providing the lowest quality video available and one or more enhancement layers that enhance the video quality when received and decoded together with the lower layers. In order to improve coding efficiency for the enhancement layers, the coded representation of that layer may depend on the lower layers. E.g., the motion and mode information of the enhancement layer can be predicted from lower layers. Similarly, the pixel data of the lower layers can be used to create prediction for the enhancement layer.

A scalable video codec for quality scalability (also known as Signal-to-Noise or SNR) and/or spatial scalability may be implemented as follows. For a base layer, a conventional non-scalable video encoder and decoder is used. The reconstructed/decoded pictures of the base layer are included in the reference picture buffer for an enhancement layer. In H.264/AVC, HEVC, and similar codecs using reference picture list(s) for inter prediction, the base layer decoded pictures may be inserted into a reference picture list(s) for coding/decoding of an enhancement layer picture similarly to the decoded reference pictures of the enhancement layer. Consequently, the encoder may choose a base-layer reference picture as inter prediction reference and indicate its use typically with a reference picture index in the coded bitstream. The decoder decodes from the bitstream, for example from a reference picture index, that a base-layer picture is used as inter prediction reference for the enhancement layer. When a decoded base-layer picture is used as prediction reference for an enhancement layer, it is referred to as an inter-layer reference picture.

In addition to quality scalability, following scalability modes exist:

Spatial scalability: Base layer pictures are coded at a lower resolution than enhancement layer pictures.

Bit-depth scalability: Base layer pictures are coded at lower bit-depth (e.g., 8 bits) than enhancement layer pictures (e.g., 10 or 12 bits).

Chroma format scalability: Enhancement layer pictures provide higher fidelity in chroma (e.g., coded in 4:4:4 chroma format) than base layer pictures (e.g., 4:2:0 format).

In all of the above scalability cases, base layer information could be used to code enhancement layer to minimize the additional bitrate overhead.

Scalability can be enabled in two basic ways. Either by introducing new coding modes for performing prediction of pixel values or syntax from lower layers of the scalable representation or by placing the lower layer pictures to the reference picture buffer (decoded picture buffer, DPB) of the higher layer. The first approach is more flexible and thus can provide better coding efficiency in most cases. However, the second, reference frame-based scalability, approach can be implemented very efficiently with minimal changes to single layer codecs while still achieving majority of the coding efficiency gains available. Essentially a reference frame-based scalability codec can be implemented by utilizing the same hardware or software implementation for all the layers, just taking care of the DPB management by external means.

In order to be able to utilize parallel processing, images can be split into independently codeable and decodable image segments (slices or tiles). "Slices" may refer to image segments constructed of certain number of basic coding units that are processed in default coding or decoding order, while "tiles" may refer to image segments that have been defined as rectangular image regions that are processed at least to some extend as individual frames.

Video may be encoded in YUV or YCbCr color space as that is found to reflect some characteristics of human visual system and allows using lower quality representation for Cb and Cr channels as human perception is less sensitive to the chrominance fidelity those channels represent.

Figure 3:
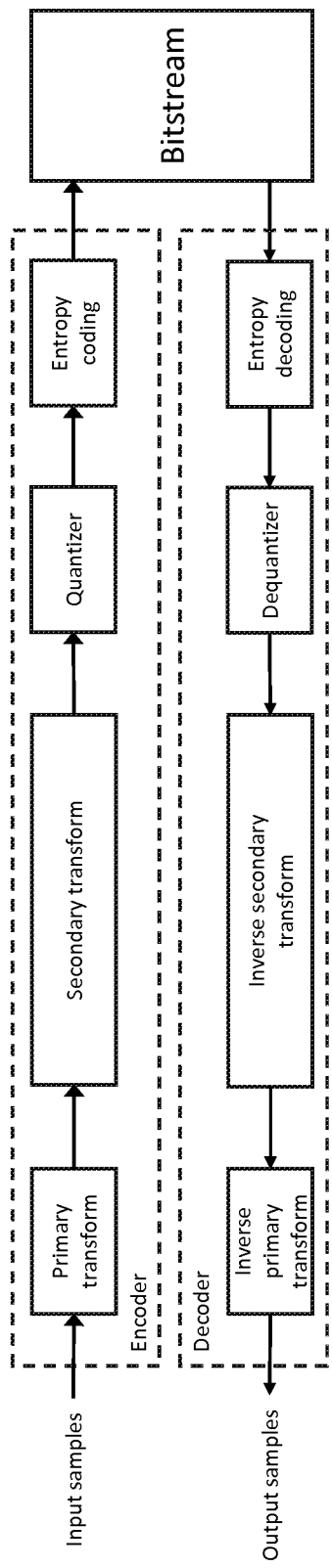
FIG. 3 shows an example of a conventional video compression system using a secondary transform.

FIG. 3 illustrates state-of-the-art image or video compression system using a secondary transform. Secondary transform takes output of the forward primary transform as its input, applies a specific transformation operation to that data and produces secondary transformed samples as its output. These transformed samples are fed into quantization and entropy coding processes to form a bitstream representation consisting of bitstream syntax elements describing the sign and quantized magnitude of the transformed samples. On the decoder side, the bitstream is parsed and syntax element are decoded by an entropy decoder to regenerate the quantized transform sample values. These values are dequantized and fed into the inverse secondary transform process that will output inverse secondary transformed sample which are further input to the inverse primary transform process. That process recovers the output samples in spatial domain by applying inverse transformation means, e.g., by performing inverse Discrete Cosine Transform to its input. The output samples of this process are typically residual sample values that are added to predicted sample values to form so called reconstructed samples. Reconstructed samples may go through still additional processing, such as deblocking filtering or other filtering processes, before those are outputted to a video picture memory or a display device.

KLT or Karhunen-Loeve transform is a solution that is based on a concept that a two-dimensional data set can be decomposed into a number of components, so-called eigenvectors, where the first component contains the highest correlatable events, moving onto next eigenvector with events with less degree of correlation. KLT is known to have some desirable characteristics making it a good candidate for efficient data representation in video and imaging use cases. These characteristics include optimal energy compaction and optimal truncation capabilities for a multi-dimensional source with a known covariance. While providing good energy compaction, KLT's drawback is its complexity. In order to generate the KLT basis functions one needs to model the input data of N samples by generating an N×N covariance matrix and calculate the N eigenvectors of that covariance matrix.

Main bottleneck for a practical implementation of the KLT is the high dimensionality of the covariance matrix making calculation of the eigenvectors an extremely complex task. For example, even for a relatively small residual sample block with a size of 64 samples, the covariance matrix becomes of size 64×64 and the number of eigenvectors to be resolved becomes 64. This represents a massive computational task especially if it needs to be performed multiple times per picture as more data is collected and the optimal KLT is adapted to that data within a picture. These complexities have prevented KLT from being used in any practical video or image coding applications.

The present embodiments are targeted to KLT so that multiple K-point KLT transforms, or a "herd-KLT", are performed within a block of M×N samples, where K may be smaller than M and N. The specification provides examples of different configurations illustrating usage of herd-KLT for both transform domain samples (sometimes referred to as transform coefficients) and in spatial domain operating on e.g., residual samples (samples representing difference between original or reconstructed samples and predicted samples). A herd-KLT may include a set of identical KLT transforms, or the KLT transforms forming a herd-KLT may be independent and characterized with individual statistics and individual transform matrices, or a herd-KLT may consists of a mixture of those. Examples of selecting or assigning a particular KLT for certain set of samples within a herd-KLT block based on different contextual aspects, such as frequency of the modelled transform domain samples or texture of the corresponding predicted samples, are provided.

A herd-KLT according to present embodiments consists of at least two KLT transforms. In this specification term "KLT transform" can refer to a forward KLT transform, an inverse KLT transform or a pair consisting of a forward and inverse KLT transform. "KLT transform" can also refer to any data dependent transform. For example, it can refer to a Karhunen-Loeve transform with transform matrix representation having double precision floating point coefficients, or a similarly generated transform matrix with scaled and quantized fixed point coefficients, or another transform with either floating point or fixed point coefficients generated with other data driven methods.

Figure 4:
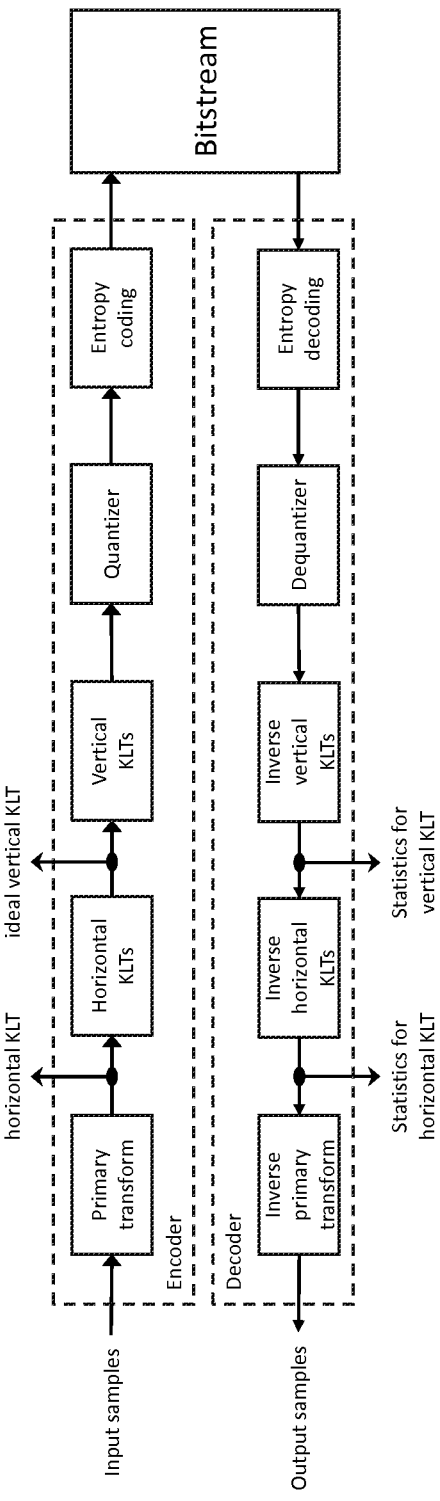
FIG. 4 shows a video compression system according to present embodiments using a secondary transform.

FIG. 4 illustrates a system according to an embodiment. As is shown in the figure, secondary transform process is split into horizontal and vertical processing, namely horizontal and vertical herd-KLT transforms. The herd-KLT transforms can both have their independent transform matrices and their independent statistical models. In order to collect statistics for creating optimal KLT transforms, the distribution of the input data to the forward KLT transforms should be used. A statistical model can comprise, for example, information about the covariance of the samples transformed so far by the transform since the last reset of the statistics. Statistics can be reset for example when starting encoding or decoding a new picture or a new slide. Statistics can be reset to zero or to a predetermined state known both to encoder and decoder. Different parameters can be indicated in a bitstream to describe the initial state of statistics to allow more reliable starting point for collecting the statistics and updating the transform matrices based on the statistics. The statistics in the embodiment according to FIG. 4 may be collected after the inverse transforms and used to adapt the KLTs both on encoder and decoder side without the need to explicitly indicate updates to the KLT transform matrices.

The transform matrices can be updated to reflect the statistics either after every transform operation that the transform performs or at other intervals. For example, transform matrices can be updated to correspond to its statistical model after decoding a full picture, a coding tree unit, a coding unit, or other suitable period. As a further example, the initial statistics or transform matrix coefficients can be signalled for an image or a video sequence and those transform matrix coefficients or transform matrices derived from the initial statistics can be used for the whole image or video sequence. The update period may be configurable and can be indicated in a bitstream to a decoder. Updating a transform matrix can, for example, include calculating the eigenvectors of the covariance matrix generated based on the collected statistics for the specific transform, and assigning those eigenvectors or normalized versions of those eigenvectors as the basis functions for the transform.

As an example, the inverse transform matrix klt[y][x] for a 2-point transform can be calculated from the covariance matrix covar[y][x] as follows:

$$a = covar[0][0]$$

$$b = covar[0][1]$$

$$c = covar[1][0]$$

$$d = covar[1][1]$$

$$klt[0][0] = 1.0$$

$$klt[0][1] = 0.0$$

$$klt[1][0] = 0.0$$

$$klt[1][1] = 1.0$$

$$T = a + d$$

-continued $$D = a*d - b*c$$
$$e = 0.25*T*T - D$$
$$\text{if } e >= 0.0\{$$
$$f = sqrt(e)$$
$$L1 = 0.5*T + f$$
$$L2 = 0.5*T - f$$
$$\text{if } c \mathrel{!}= 0.0\{$$
$$klt[0][0] = L1 - d$$
$$klt[0][1] = L2 - d$$
$$klt[1][0] = c$$
$$klt[1][1] = c$$
$$\}$$
$$\text{else if } b \mathrel{!}= 0.0\{$$
$$klt[0][0] = b$$
$$klt[0][1] = b$$
$$klt[1][0] = L1 - a$$
$$klt[1][1] = L2 - a$$
$$\}$$
$$\}$$

In this approach the inverse transform matrix klt[y][x] is initialized as an identity matrix which will be used e.g., if the term e had negative values that would lead imaginary solutions for the eigenvalues L1 and L2. The resulting matrix can be further normalized to have zero gain using e.g., the following pseudo code:

$$s1 = sqrt(klt[0][0]*klt[0][0] + klt[1][0]*klt[1][0])$$
$$s2 = sqrt(klt[0][1]*klt[0][1] + klt[1][1]*klt[1][1])$$
$$\text{if } s1 == 0.0 || s2 == 0.0\{$$
$$klt[0][0] = 1.0$$
$$klt[0][1] = 0.0$$
$$klt[1][0] = 0.0$$
$$klt[1][1] = 1.0$$
$$\}$$
$$\text{else } \{$$
$$klt[0][0] = klt[0][0]/s1$$
$$klt[1][0] = ktl[1][0]/s1$$
$$klt[0][1] = klt[0][1]/s2$$
$$klt[1][1] = klt[1][1]/s2$$
$$\}$$

In order to reduce the number of division operations, which may be beneficial in some implementation environments, the four divisions under the else clause can be substituted with multiplications with the inverses of the scales as follows:

$$u1 = 1.0/s1$$
$$u2 = 1.0/s2$$
$$klt[0][0] = u1*klt[0][0]$$
$$klt[1][0] = u1*klt[1][0]$$
$$klt[0][1] = u2*klt[0][1]$$
$$klt[1][1] = u2*klt[1][1]$$

In addition, the coefficients may be quantized to a fixed point representation to make the subsequent use of the inverse transform matrix more computationally efficient in different implementation platforms. Also, the calculations described above can be approximated with fixed point representations of the operations to speed up generation of transform matrices. It should be noted that in the case of the KLT and KLT-like transforms, the transform is orthogonal or nearly orthogonal and the forward transform matrix is thus the transpose of the inverse matrix. In this kind of scenarios, there is typically no need to separately calculate forward and inverse matrices, but the same matrix can be used with different addressing of its elements for both forward and inverse operations.

According to an embodiment, a video or image decoder performs the following steps:
  receiving a block of input samples;
  determining at least a first and a second input sample from the block of input samples;
  performing a first inverse transform on said at least first and second input samples resulting in a first set of inverse transformed samples;
  determining statistical information related to the first set of inverse transformed samples;
  determining at least a third and a fourth input sample from the block of input samples, different from the first and second input sample;
  performing a second inverse transform on said at least third and fourth input samples, resulting in a second set of inverse transformed samples;
  determining statistical information related to the second set of inverse transformed samples
  updating the first inverse transform based on the determined statistical information related to the first set of inverse transformed samples; and
  updating the second inverse transform based on the determined statistical information related to the second set of inverse transformed samples.

The input samples to the decoding process may be considered to be in transform domain as the decoding process performs inverse transformation operations, but an encoder may be free to generate the samples for decoding as it sees fit, and the samples may not be always in a strictly defined "transform domain".

The statistical information describes selected characteristics or distribution of the coded data. As an example, covariance between different sample values can be determined. As an additional example, variance of at least some of the sample values or the average value of at least some of the sample values can be determined. Statistics can be calculated and stored as soon as the output of the inverse transform is generated, or statistics can be calculated at later time instance, for example before updating the inverse transforms or when updating the inverse transforms.

The first and second inverse transform can be selected from a set of candidate transforms, for example, based on the location of the input samples in the block; based on coding, prediction or transform unit parameters, such as the coding mode or prediction direction; or based on prediction block characteristics, such as the directionality or variance of the texture of the prediction block; or a combination or those.

The first and second inverse transforms can be independent from each other and thus have their own statistics collection mechanisms and their own transform matrices. Alternatively, they may share some of their statistics; or the same transform with the same statistics may be used for both.

Figure 8:
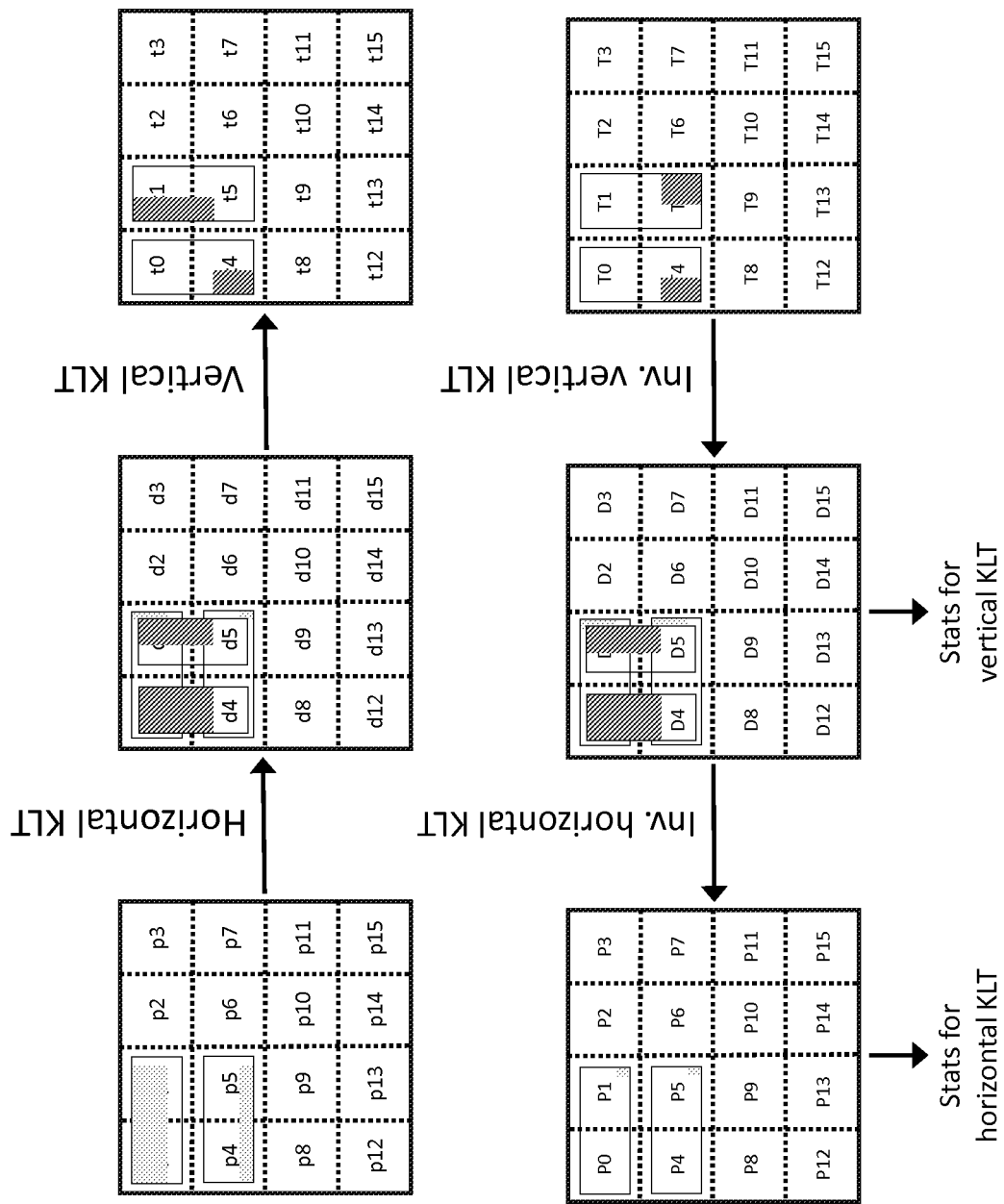
FIG. 8 illustrates an example of cascaded horizontal and vertical herd-KLTs with some of the samples bypassing the transformations.

A set of transforms forming a herd-KLT may be selected so that every input sample to the herd-KLT maps to a specific N-point KLT transform and thus all the samples in the input block will go through a transformation process. Alternatively, as shown in FIG. 8, a subset of input samples may bypass the transformation processes and thus can be copied directly to the output block (or left unmodified in the block of samples in the case the same block is used for input and output).

Both first and second inverse transforms can be vertical transforms, or both first and second inverse transforms can be horizontal transforms. Alternatively, the first inverse transform can be a vertical transform and the second inverse transform can be a horizontal transform. As a further example, the first inverse transform can be a horizontal transform and the second inverse transform can be a vertical transform. As a further example, either first or second inverse transform, or both, can be diagonal transforms having input and output samples oriented at a 45 degree or another angle with respect to each other. In the case the transforms are N-point transforms with N larger than 2, the transform's input and output sample locations in a block can be determined in further different ways. Those can be either 1-dimensional transforms with samples aligned in a horizontal, vertical, diagonal or along other direction; or those can be 2-dimensional transforms with input and output sample positions specified in different manners.

Figure 10:
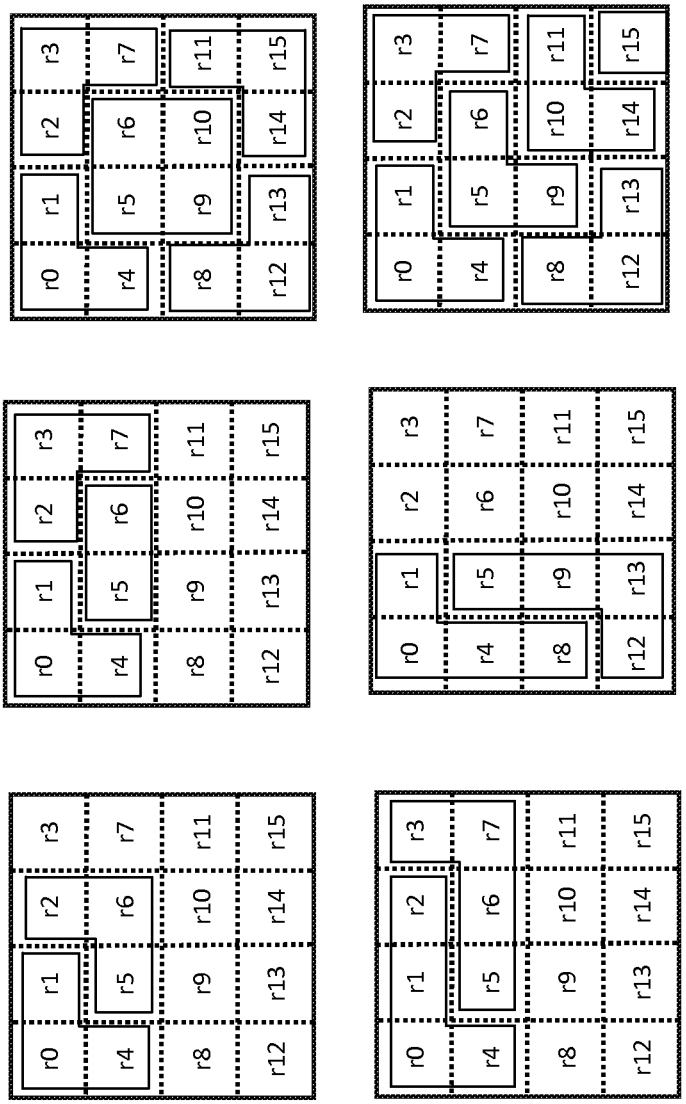
FIG. 10 illustrates an example of different types of L-shape transforms.

For example, the input and output samples of a 3-point transform can be defined to form an "L-shape" with the first sample considered a corner sample, the second sample positioned right of the corner sample and the third sample positioned below the corner sample. Alternatively, the input and output samples of a 4-point transform can be defined to form an "L-shape4" with the first sample considered a corner sample, the second and the third samples positioned right/below of the corner sample and the fourth sample positioned below/right the corner sample. Alternatively, the input and output samples of a 4-point transform can be defined to form an "L-shape5" with the first sample considered a corner sample, the second, the third, and the fourth samples positioned right/below of the corner sample and the fifth sample positioned below/right the corner sample. In another example, "Rotated-L-shape"/"Rotated-L-shape4"/ "Rotated-L-shape5" is formed as 90-degree, 180-degree, 270-degree rotation, or horizontally/vertically flipped of "L-shape"/"L-shape4"/"L-shape5". The "Rotated-L-shapes" may have their own transform. In another example, "L-shape" and "Rotated-L-shape" can form a 3×2 or 2×3 subblock. Alternatively, "L-shape4" and "Rotated-L-shape4" can be placed in the block to form a 4×2 or 4×2 subblock, and the original block can be divided into these subblocks. FIG. 10 shows alternative methods to cover an input block using different types of "L-shape" transforms. Alternatively, different samples in a block may be transformed using different transform shape. For example, top part of the block may be transformed using combinations of "L-shape3", and bottom part of the block may be transformed using "Rotated-L-shape4".

Different samples or subblocks of the input block may be classified to different classes, and each class may have its own inverse transform. Statistical information may be determined for each class separately. Different classes may be, for example, defined based on intra prediction mode of the block. Alternatively, input blocks may be divided into smaller subblocks (e.g., 4×4) and each subblock may be classified based on the texture directionality of its prediction samples. Texture directionality can be determined based on the gradient in horizontal, vertical, and diagonal directions, and their ratios.

Additional processing can be involved between the steps described above or different stages of the processing. For example, samples can be rearranged or modified by other means at different phases of the processing pipeline. Rearranging can include grouping of samples with certain characteristics together in the block of samples. For example, output samples corresponding to the first basis functions of the transforms can be grouped together or inverse of such grouping could be performed. Also, samples can be filtered, scaled, normalized, quantized or dequantized in different phases of the processing.

The first and second inverse transforms can be cascaded one after another or cascaded with additional herd-KLT transforms. For example, cascading transforms with the same directionality allows creation of a hierarchical transformation with transforms at different level of the hierarchy having different statistical models tracking distribution of the data at different scales. Such cascaded transforms with first directionality can be advantageously combined with cascading transforms with second directionality. For example, a decoder can feed samples first through a series of cascaded vertical transforms followed by feeding the samples through a series of cascaded horizontal transforms. As another example, a decoder can feed samples first through a series of cascaded horizontal transforms followed by feeding the samples through a series of cascaded vertical transforms.

According to an alternative embodiment, a video or image decoder performs cascading transforms according to the following steps:
  receiving a block of input samples;
  performing at least a first inverse transform on input samples, resulting in a first set of inverse transformed samples;
  determining statistical information related to the first set of inverse transformed samples;
  performing at least a second inverse transform on the first set of inverse transformed samples, resulting in a second set of inverse transformed samples;
  determining statistical information relating to the second set of inverse transformed samples;
  updating the first inverse transform based on the determined statistical information related to the first set of inverse transformed samples; and
  updating the second inverse transform based on the determined statistical information related to the second set of inverse transformed samples.

According to an embodiment, determining of statistical information includes calculating covariance of those inverse transformed samples that were output from an inverse transform. Determining the information may also include adding the calculated covariance in matrix, array, or scalar representation to earlier statistical data.

According to an embodiment, updating the first inverse transform includes calculating at least one eigenvector of a covariance matrix derived from determined statistics information.

According to an embodiment the first inverse transform is a vertical linear transform and the second transform is a horizontal linear transform.

According to an embodiment the first inverse transform is a horizontal linear transform and the second transform is a vertical linear transform.

Various examples on herd-KLT are illustrated in FIGS. 5-10.

Figure 5:
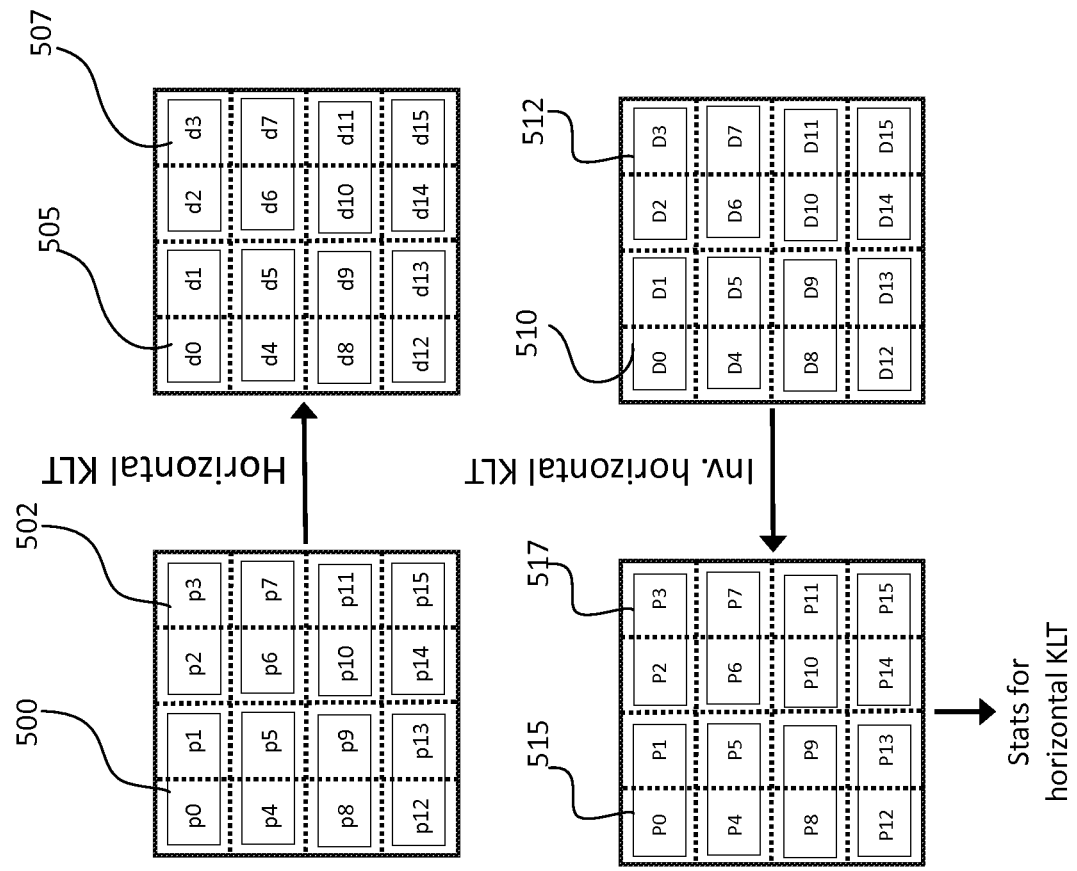
FIG. 5 illustrates an example of a horizontal herd-KLT for a 4×4 block of samples.

FIG. 5 illustrates a horizontal herd-KLT for a 4×4 block of samples. In this example 8 different 2-point horizontal transforms and corresponding 8 inverse transforms are used. For example, the first forward transform takes p0 and p1 500 as inputs and outputs d0 and d1 505. The second forward transform takes p2 and p3 502 as inputs and outputs d2 and d3 507. Similarly, the first inverse transform takes D0 and D1 510 as inputs and outputs P0 and P1 515, while the second inverse transform takes D2 and D3 512 as inputs and output P2 and P3 517.

Figure 6:
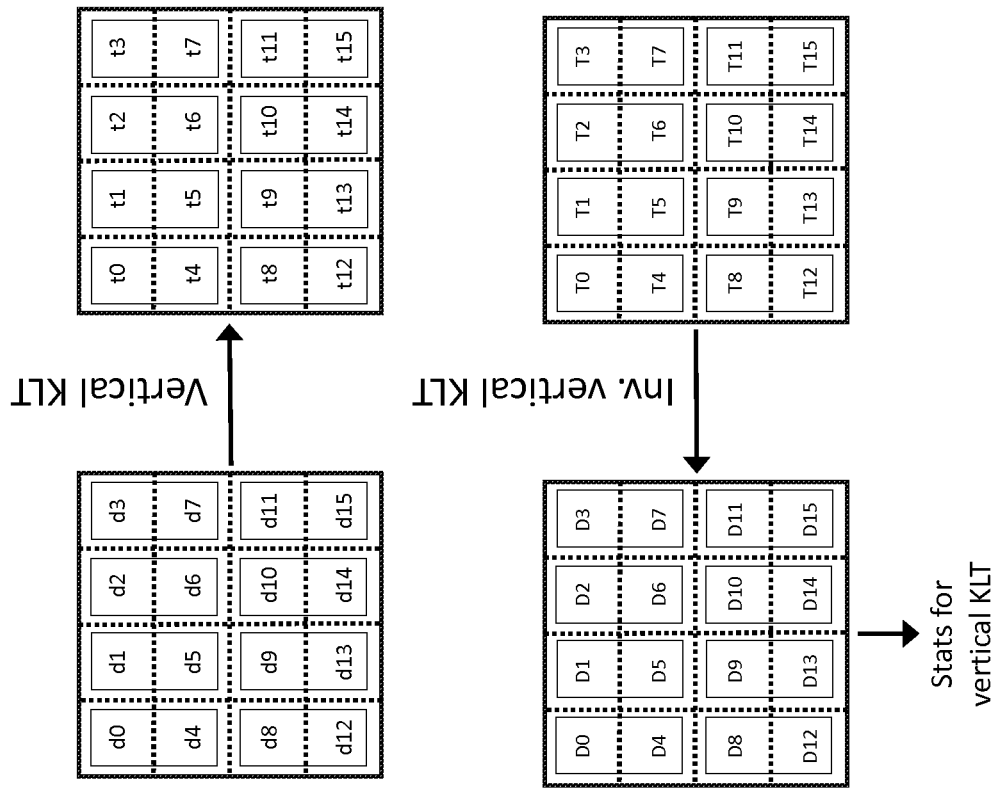
FIG. 6 illustrates an example of a vertical herd-KLT for a 4×4 block of samples.

FIG. 6 illustrates a vertical herd-KLT for a 4×4 block of samples. The operation is identical to that of the horizontal herd-KLT shown in FIG. 5 with the difference of alignment of the input and output samples.

Figure 7:
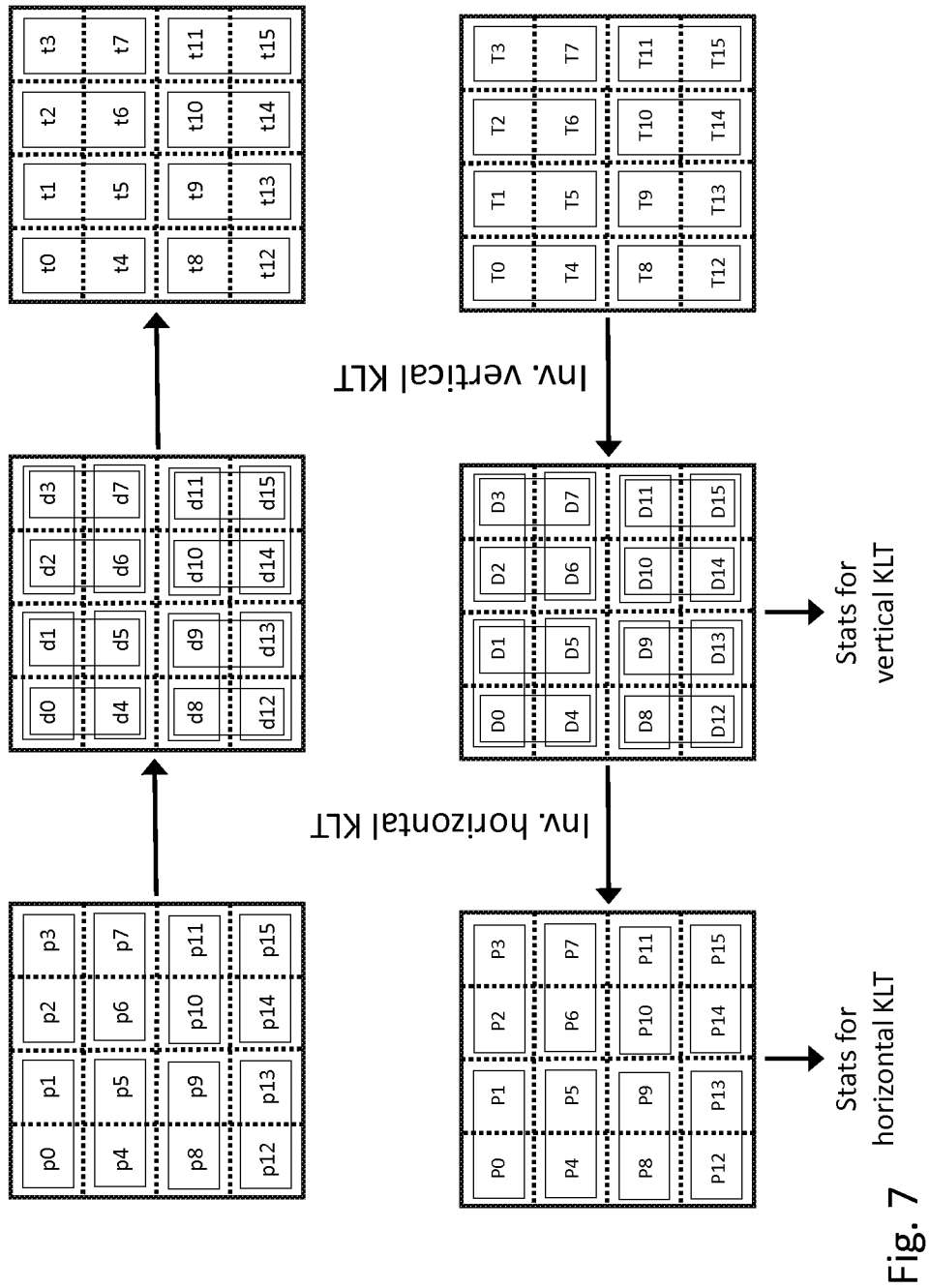
FIG. 7 illustrates an example of horizontal and vertical forward herd-KLTs cascaded one after another.

FIG. 7 illustrates horizontal and vertical forward herd-KLTs cascaded one after another. The inverse transforms are cascaded similarly but processing is performed in inverse order starting from the vertical direction.

FIG. 8 illustrates cascaded horizontal and vertical herd-KLTs with some of the samples bypassing the transformations. In this example transforms are only applied on the top-left corner of the block while the rest of the samples are directly passed through the transforms without modifications to their values.

Figure 9:
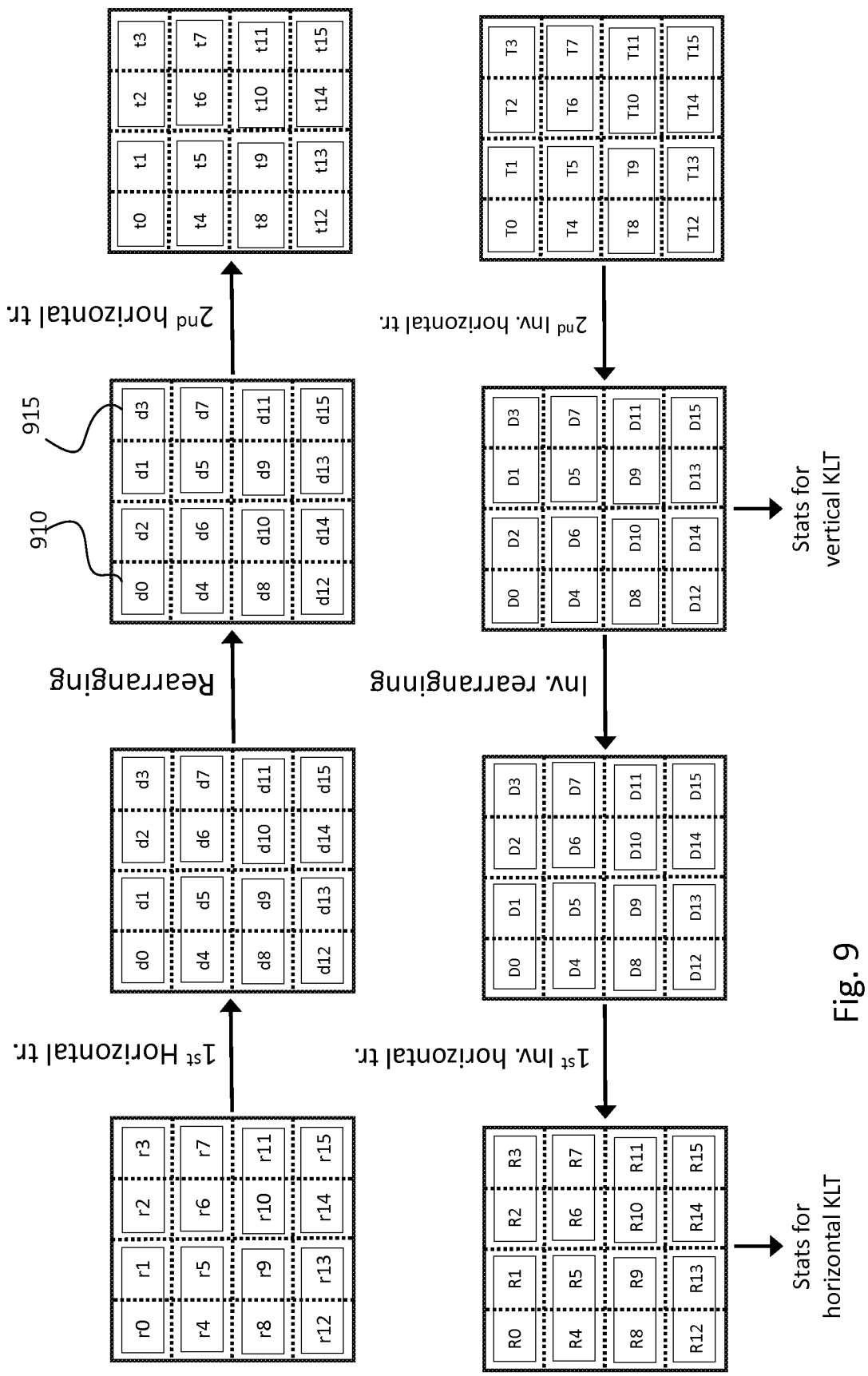
FIG. 9 illustrates an example of rearranging operation between different transform stages.

FIG. 9 illustrates a rearranging operation between different transform stages. In this example the output of the first horizontal herd-KLT is rearranged so that the outputs corresponding to the first basis functions (dX with even X) are positioned on the left side 910 of the block and the outputs corresponding to the second basis functions (dX with odd X) are positioned on the right side 915 of the block. Inverse of the rearrangement operation is applied during the inverse transformation process.

FIG. 10 illustrates different types of "L-shape" transforms, and provides examples on how they can cover an input block.

Figure 11:
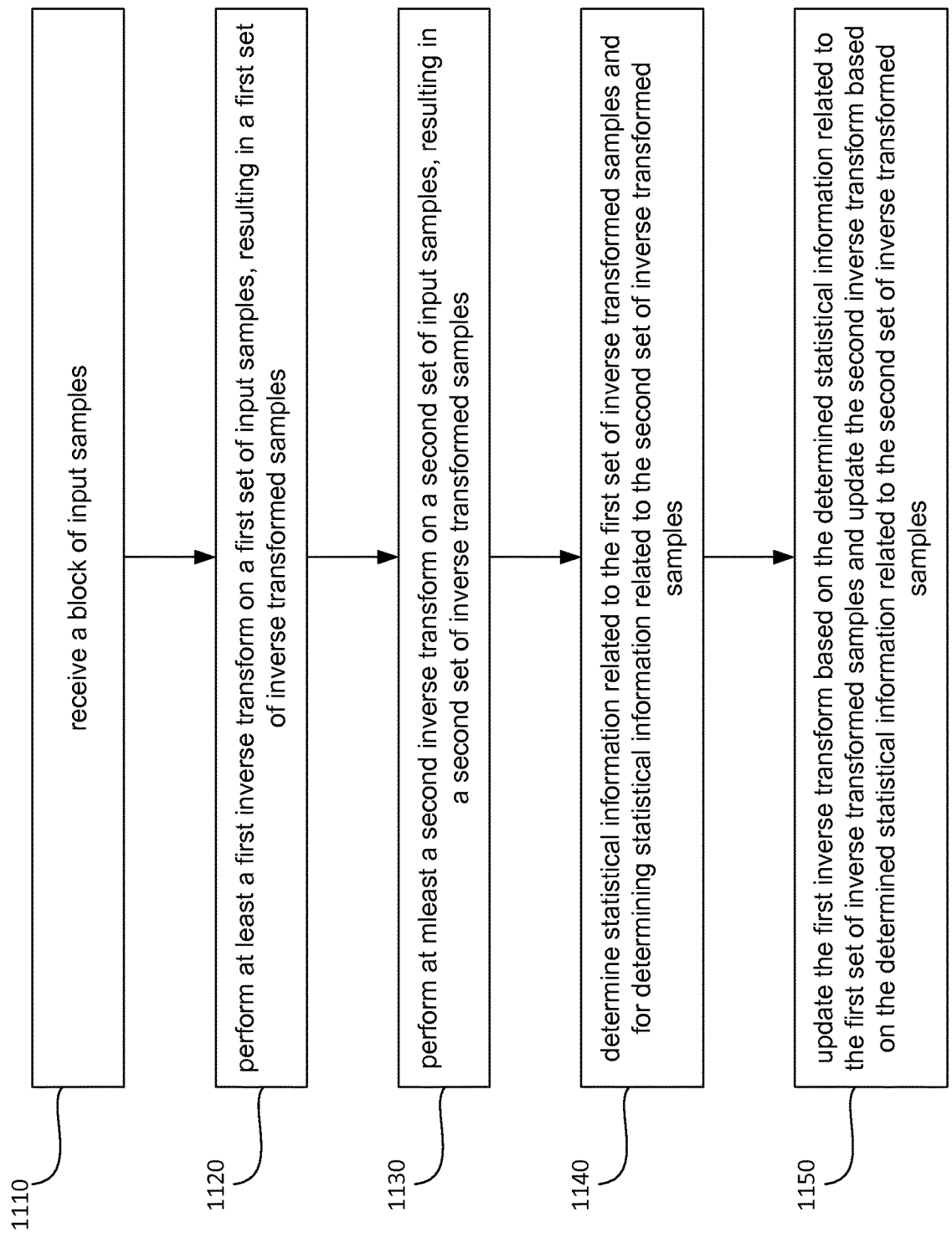
FIG. 11 is a flowchart illustrating a method according to an embodiment.

The method according to an embodiment is shown in FIG. 11. The method generally comprises receiving 1110 a block of input samples; performing 1120 at least a first inverse transform on a first set of input samples from the block of input samples, resulting in a first set of inverse transformed samples; performing 1130 at least a second inverse transform on a second set of input sample from the block of input samples, resulting in a second set of inverse transformed samples; determining 1140 statistical information related to the first set of inverse transformed samples and for determining statistical information related to the second set of inverse transformed samples; updating 1150 the first inverse transform based on the determined statistical information related to the first set of inverse transformed samples; and updating the second inverse transform based on the determined statistical information related to the second set of inverse transformed samples. Each of the steps can be implemented by a respective module of a computer system.

An apparatus according to an embodiment comprises means for receiving a block of input samples; means for performing at least a first inverse transform on a first set of input samples from the block of input samples, resulting in a first set of inverse transformed samples; means for performing at least a second inverse transform on a second set of input samples from the block of input samples, resulting in a second set of inverse transformed samples; means for determining statistical information related to the first set of inverse transformed samples and for determining statistical information related to the second set of inverse transformed samples; means for updating the first inverse transform based on the determined statistical information related to the first set of inverse transformed samples; and updating the second inverse transform based on the determined statistical information related to the second set of inverse transformed samples. The means comprises at least one processor, and a memory including a computer program code, wherein the processor may further comprise processor circuitry. The memory and the computer program code are configured to, with the at least one processor, cause the apparatus to perform the method of FIG. 11 according to various embodiments.

Figure 12:
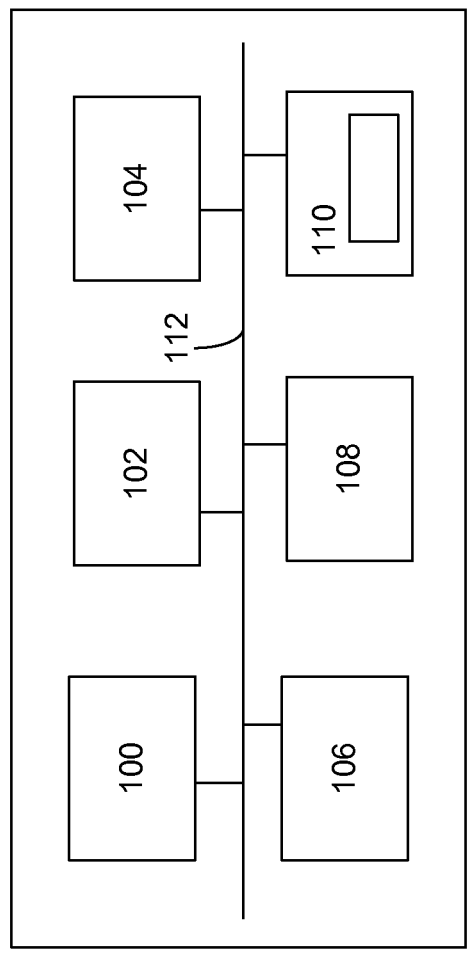
FIG. 12 shows an apparatus according to an example embodiment.

FIG. 12 shows an example of an apparatus. The generalized structure of the apparatus will be explained in accordance with the functional blocks of the system. Several functionalities can be carried out with a single physical device, e.g., all calculation procedures can be performed in a single processor if desired. A data processing system of an apparatus according to an example of FIG. 12 comprises a main processing unit 100, a memory 102, a storage device 104, an input device 106, an output device 108, and a graphics subsystem 110, which are all connected to each other via a data bus 112. A client may be understood as a client device or a software client running on an apparatus.

The main processing unit 100 is a processing unit arranged to process data within the data processing system. The main processing unit 100 may comprise or be implemented as one or more processors or processor circuitry. The memory 102, the storage device 104, the input device 106, and the output device 108 may include other components as recognized by those skilled in the art. The memory 102 and storage device 104 store data in the data processing system 100. Computer program code resides in the memory 102 for implementing, for example, machine learning process. The input device 106 inputs data into the system while the output device 108 receives data from the data processing system and forwards the data, for example to a display. While data bus 112 is shown as a single line it may be any combination of the following: a processor bus, a PCI bus, a graphical bus, an ISA bus. Accordingly, a skilled person readily recognizes that the apparatus may be any data processing device, such as a computer device, a personal computer, a server computer, a mobile phone, a smart phone, or an Internet access device, for example Internet tablet computer.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving, and transmitting data, computer program code in a memory, and a processor that, when running the computer program code, causes the network device to carry out various features of an embodiment.

A computer program product according to an embodiment can be embodied on a non-transitory computer readable medium. According to another embodiment, the computer program product can be downloaded over a network in a data packet.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. An apparatus comprising at least one processor, memory including computer program code, the memory and the computer program code configured to, with the at least one processor, cause the apparatus at least to:
   receive a block of input samples;
   perform at least a first inverse transform on a first set of input samples from the block of input samples, resulting in a first set of inverse transformed samples;
   perform at least a second inverse transform on a second set of input samples from the block of input samples, resulting in a second set of inverse transformed samples;
   determine statistical information related to the first set of inverse transformed samples and for determining statistical information related to the second set of inverse transformed samples;
   update the first inverse transform based on the determined statistical information related to the first set of inverse transformed samples; and update the second inverse transform based on the determined statistical information related to the second set of inverse transformed samples.

2. The apparatus according to claim 1, wherein the apparatus upon execution is further caused to determine at least a first and a second input samples from the block of input samples, and perform the first inverse transform on said first set of input samples comprising said at least first and second input samples.

3. The apparatus according to claim 2, wherein the apparatus upon execution is further caused to determine at least a third and a fourth input samples from the block of input samples, wherein said third and fourth input samples are different from the first and second input samples, and perform the second inverse transform on said second set of input samples comprising said at least third and fourth input samples.

4. The apparatus according to claim 1, wherein said second set of input samples comprise the first set of inverse transformed samples.

5. The apparatus according to claim 1, wherein the statistical information comprises one or more of the following: covariance between at least two sample values; variance of one or more sample values; or an average value of one or more sample values.

6. The apparatus according to claim 1, wherein the first or a second inverse transform is based on any of the following: a location of input samples; coding unit; prediction unit or transform unit parameters; or prediction block characteristics.

7. The apparatus according claim 1, wherein the first or a second inverse transform is a horizontal transform or a vertical transform or a diagonal transform or a transform along other direction.

8. A method comprising:
   receiving a block of input samples;
   performing at least a first inverse transform on a first set of input samples from the block of input samples, resulting in a first set of inverse transformed samples;
   performing at least a second inverse transform on a second set of input samples from the block of input samples, resulting in a second set of inverse transformed samples;
   determining statistical information related to the first set of inverse transformed samples and for determining statistical information related to the second set of inverse transformed samples;
   updating the first inverse transform based on the determined statistical information related to the first set of inverse transformed samples; and updating the second inverse transform based on the determined statistical information related to the second set of inverse transformed samples.

9. The method according to claim 8, further comprising determining at least a first and a second input sample from the block of input samples, and performing the first inverse transform on said first set of input samples comprising said at least first and second input samples.

10. The method according to claim 9, further comprising determining at least a third and a fourth input sample from the block of input samples, wherein said third and fourth input samples are different from the first and second input samples, and performing the second inverse transform on said second set of input samples comprising said at least third and fourth input samples.

11. The method according to claim 8, wherein said second set of input samples comprises the first set of inverse transformed samples.

12. The method according to claim 8, wherein the statistical information comprises one or more of the following: covariance between at least two sample values; variance of one or more sample values; average value of one or more sample values.

13. The method according to claim 8 wherein a first or a second inverse transform is based on any of the following: based on a location of input samples; coding unit; prediction unit or transform unit parameters; prediction block characteristics.

14. The method according to claim 8, wherein a first or a second inverse transform is a horizontal transform or a vertical transform or a diagonal transform or a transform along other direction.

* * * * *